July 15, 1952 R. W. LARSON 2,603,744
TUNING MECHANISM
Filed Sept. 14, 1945

INVENTOR
ROLAND W. LARSON
BY William D. Hall
ATTORNEY

Patented July 15, 1952 2,603,744

UNITED STATES PATENT OFFICE 2,603,744

TUNING MECHANISM

Roland W. Larson, Marshfield, Wis., assignor, by mesne assignments, to the United States of America as represented by the Secretary of War Application September 14, 1945, Serial No. 616,363

7 Claims. (Cl. 250—13)

This invention relates to radio object-locating systems in which the transmitting frequency is variable and more particularly to means affording overall tuning of the system throughout the transmitting frequency range.

For purposes of eluding enemy detection and to lessen the likelihood and effectiveness of externally caused interference, it has been proposed to vary the transmitting frequency of the radio object-locating system either cyclically over a given band or periodically and at random. The former method is generally preferred, and as a desirable adjunct thereto provision may be made to vary the period of the cycle, band covered and type of cycle, i. e., sinusoidal, sawtooth, etc. In such a system it is also highly desirable to vary the resonant frequency of the transmit-receive (T-R) device and the frequency of the local oscillator rather than design the T-R device and intermediate-frequency amplifier for broad band response.

It is an object of the present invention, therefore, to provide a means which enables the transmit-receive device to be tuned in conjunction with the tuning of the transmitter.

It is a further object of the present invention to provide means for enabling overall tuning of the radio object-locating system in conjunction with the tuning of the transmitter.

For a better understanding of the invention, together with other and further objects thereof, reference is had to the following description, taken in connection with the accompanying drawing in which.

Figure 1:
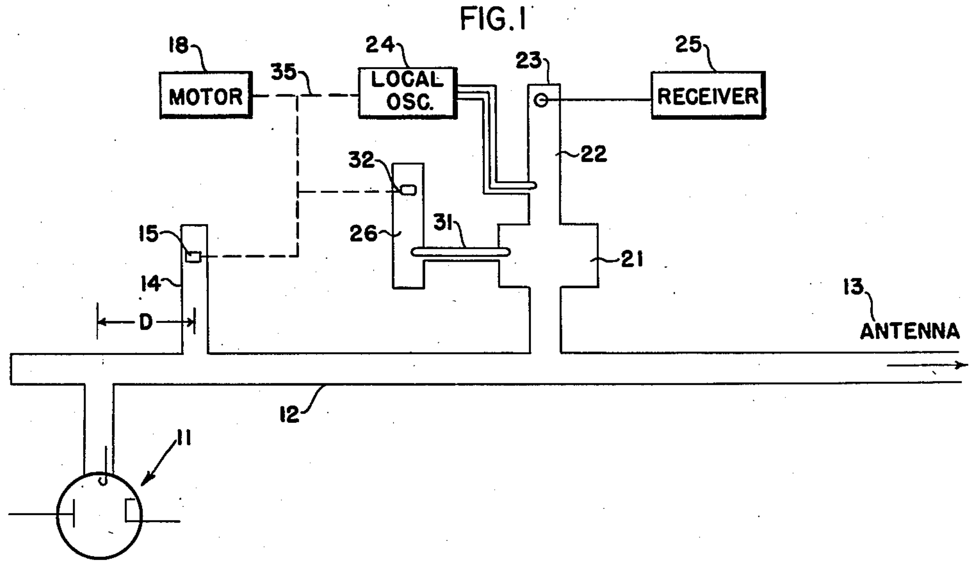
Fig. 1 is a schematic diagram illustrating one embodiment of the invention.

Referring now to the drawing and more particularly to Fig. 1 thereof, there is shown a schematic diagram of a radio object-locating system with particular emphasis on the ultra-high frequency portions thereof. The system as shown comprises an oscillator 11, preferably of the magnetron type, adapted to feed a wave guide 12, the other end of which terminates in an antenna 13 or other desired load. The wave guide 12 and other wave guide sections to be described later are here represented by two parallel lines. No specific attempt is made to show the exact types of connections, parallel or series, probe or loop used since such connections are well known in the art and subject largely to the discretion of the builder.

Figure 2:
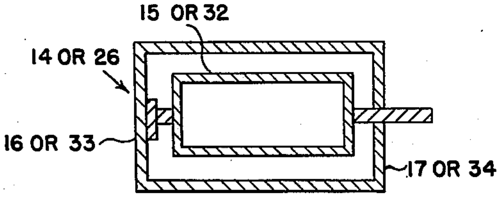
Fig. 2 is a cross-sectional view of one of the tuning rings used in this invention.

At some distance D from the connection between the oscillator 11 and the wave guide 12 a section of wave guide 14 is joined to the wave guide 12. The type of junction, distance D, length of wave guide 14 and determination for wave guide 14 are so chosen that the guide 14 becomes a resonant circuit which is essentially in parallel with the resonant circuit of the oscillator 11. A ring 15, see also Fig. 2, is mounted within and pivoted on the narrow walls, 16 and 17, Fig. 2, of the wave guide 14 and adapted to be rotated by a motor 18 or other suitable means. The ring 15 has the effect of altering the resonant frequency of the wave guide 14 with subsequent alteration in the oscillating frequency on the oscillator 11. The portion of the system so far described is disclosed and claimed in the copending application of Albert M. Clogston, Serial No. 565,363, filed November 27, 1944.

A transmit-receive (T-R) device 21 is suitably connected to the wave guide 12 in a manner well known in the art. To the output of the T-R device 21 is suitably connected a section of wave guide 22 in which a silicon crystal 23 or other suitable detector means is inserted. A local oscillator 24 is coupled into a wave guide 22 in a manner well known in the art. The output of the crystal 23 is fed to the remainder of the system receiver 25 in a conventional manner. A section of a wave guide 26 is adapted to form a resonant circuit and is coupled by a coaxial line 31 or by other suitable means to the T-R device 21 in such a manner that the resonant circuit formed by the wave guide 26 is essentially in parallel with the resonant circuit of the T-R device 21. A ring 32, see also Fig. 2, is mounted within and pivoted on the narrow walls 33 and 34 of wave guide 26 and adapted to be rotated by the motor 18 in unison with ring 15, Fig. 1. A mechanical connection 35 is also made from the motor 18 to the local oscillator 24. The mechanical movement imparted to the local oscillator 24 may be utilized to vary a voltage or to control a resonant circuit for causing the local oscillator frequency to vary in accordance with and remain in a constant relationship to changes in transmitting frequencies.

The frequency of oscillation of the oscillator 11 depends upon the resonant frequency of its resonant circuit; therefore, by varying the resonant frequency of one part of the resonant circuit of the oscillator 11, the effective resonant frequency and resulting frequency of oscillation are varied. In a like manner the effective resonant frequency of the T-R device 21 can be made to coincide with the frequency of oscillation of the oscillator 11 and thus maintain the ultra-high frequency system tuned throughout the change in transmitting frequency.

Other types of resonant circuits and means for changing the resonant frequencies may be employed, and the invention herein disclosed is not to be taken as limited to the type here shown.

While there has been described what is at present considered to be the preferred embodiment of the invention, it will be obvious to those skilled in the art that various changes and modifications may be made therein without departing from the invention.

What is claimed is:

1. In a radio object-locating system having at least a transmitting oscillator, a transmit-receive device including a resonant circuit coupled to said oscillator, and a local oscillator coupled to said device, a tuning device comprising first resonant wave guide means connected essentially in parallel with the resonant circuit of the transmitting oscillator, first tuning means for varying the resonant frequency of said first wave guide means, second resonant wave guide means connected essentially in parallel with the resonant circuit of the transmit-receive device, second tuning means for varying the resonant frequency of said second resonant wave guide means, third tuning means for varying the output frequency of the local oscillator, and driving means having an operative connection with said first, second, and third tuning means whereby the resonant frequency of the transmit-receive device is maintained at the frequency of oscillation of the transmitting oscillator and the output frequency of the local oscillator source is maintained in a predetermined relationship to the frequency of the transmitting oscillator.

2. In a radio object locating system having at least a tunable transmitter, a tunable transmit-receive device having a tuned circuit coupled to said transmitter, and a receiver coupled to said device and having a tunable local oscillator, means to simultaneously tune said transmitter, the tuned circuit of said transmit-receive device and said receiver, said means comprising a first resonant wave guide connected in parallel with the tuning circuit of the transmitter, a first tuning member carried by said wave guide and rotatable therein for tuning said last named tuning circuit, a second resonant wave guide connected in parallel with the tuning circuit of the transmit-receive device, a second tuning member carried by said second wave guide and rotatable therein for tuning the tuned circuit of said transmit-receive device, means to tune said local oscillator, and common means for simultaneously varying said first and second tuning members and local oscillator tuning means whereby the resonant frequency of the transmit-receive device is maintained at the frequency of oscillation of the transmitter and the frequency of the local oscillator is maintained in a predetermined relationship to the frequency of the transmitter.

3. In combination, a transmitting oscillator, a first wave guide connected to receive the output of said transmitting oscillator, a receiver having a local oscillator, tuning means for said local oscillator, a second wave guide connecting said receiver and said first wave guide, a transmit-receive device having a tuned circuit interrupting said second wave guide between said receiver and said first wave guide, a first resonant stub connected in parallel with the tuned circuit of said transmitting oscillator, a second resonant stub connected in parallel with the tuned circuit of said transmit-receive device, a rotatable tuning device pivotedly mounted in the interior of each of said stubs, and means to adjust simultaneously said tuning devices and said local oscillator tuning means whereby the resonant frequency of the tuned circuit of the transmit-receive device is maintained at the frequency of the transmitting oscillator and the output frequency of the local oscillator is maintained in a predetermined relationship to the frequency of the transmitting oscillator.

4. In a radio object locating system having at least a transmitting oscillator, a transmit-receive device having a tuned circuit, and a wave guide connecting said oscillator and said device, means to tune simultaneously said device and said oscillator to the same frequency, said means comprising a first resonant stub mounted on said wave guide in parallel with the tuned circuit of said oscillator, a second resonant stub mounted on said device in parallel with the resonant circuit thereof, each of said stubs being tuned by internally mounted rotatable tuning elements, and a drive mechanism for simultaneously adjusting each of said elements.

5. In combination, a transmitting oscillator, a transmit-receive device having a tuned circuit coupled to said oscillator, and means to tune simultaneously said transmitting oscillator and said transmit-receive device to the same frequency, said means comprising first wave guide means in parallel with the tuned circuit of said oscillator, second wave guide means in parallel with the tuned circuit of said transmit-receive device, tuning means mounted in each of said wave guide means, and drive means for simultaneously adjusting both said tuning means to the same frequency.

6. The combination of claim 7, in which each of said tuning means mounted in each of said waveguide means comprises a rotatable ring coupled to said drive means.

7. The system of claim 1, in which said first and second tuning means comprise rings rotatably mounted within the respective first and second waveguide means.

ROLAND W. LARSON.

REFERENCES CITED

The following references are of record in the file of this patent:

UNITED STATES PATENTS

| Number | Name | Date |
|---|---|---|
| 1,592,940 | Kendall | July 20, 1926 |
| 2,206,896 | Higgins | July 9, 1940 |
| 2,235,010 | Chaffee | Mar. 18, 1941 |
| 2,395,928 | Willoughby | Mar. 5, 1946 |
| 2,408,055 | Fiske | Sept. 24, 1946 |
| 2,433,387 | Mumford | Dec. 20, 1947 |

FOREIGN PATENTS

| Number | Country | Date |
|---|---|---|
| 358,917 | Great Britain | Oct. 14, 1931 |